April 15, 1952     J. A. RIDGWAY, JR     2,592,740
CATALYTIC CONVERSION WITH HYDROFLUORIC ACID
Filed Aug. 30, 1947
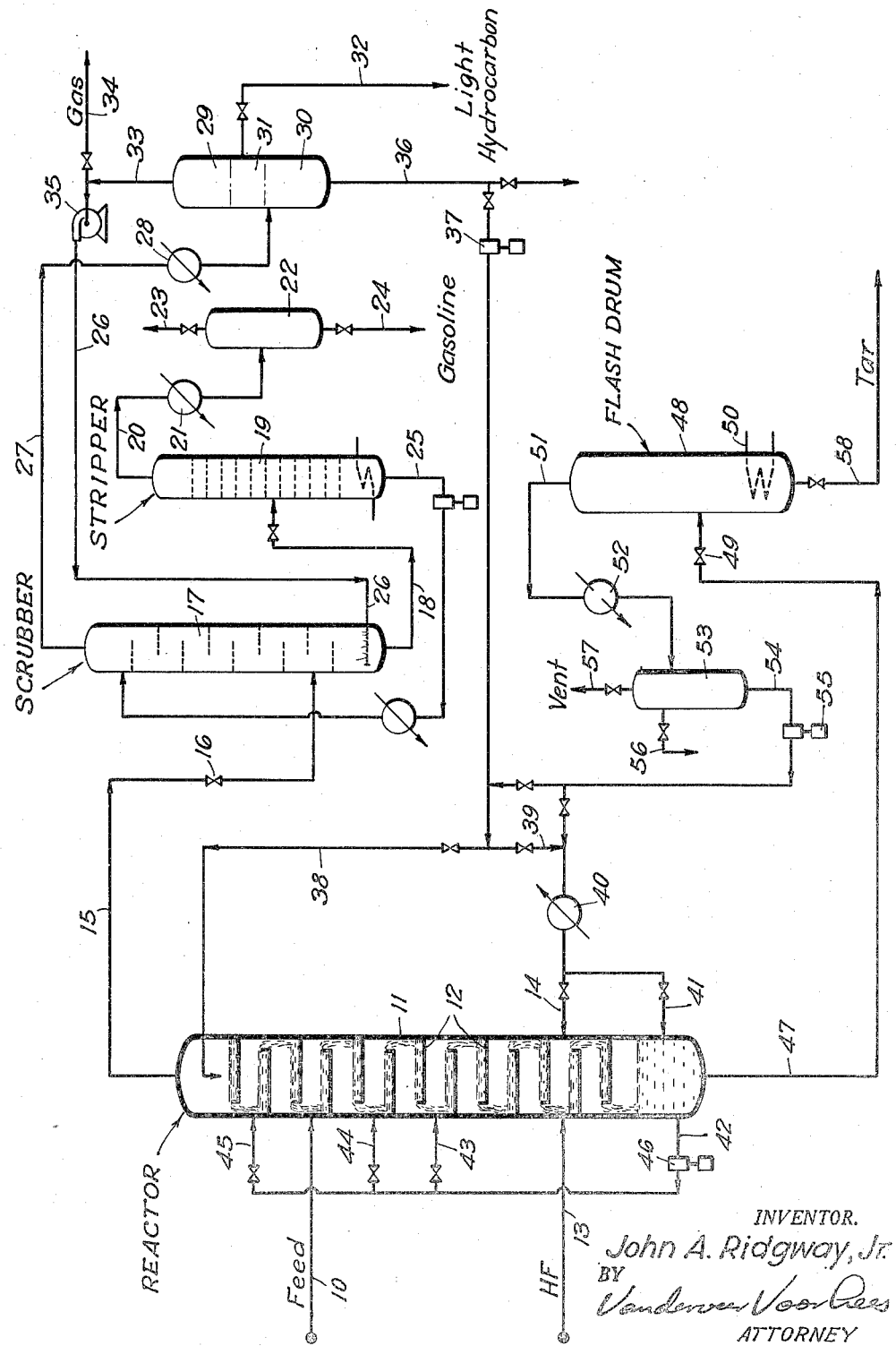
INVENTOR.
*John A. Ridgway, Jr.*
BY
*Vanderveer Voorhees*
ATTORNEY Patented Apr. 15, 1952

2,592,740

UNITED STATES PATENT OFFICE 2,592,740

CATALYTIC CONVERSION WITH HYDROFLUORIC ACID

John A. Ridgway, Jr., Texas City, Tex., assignor to Pan American Refining Corporation, Texas City, Tex., a corporation of Delaware Application August 30, 1947, Serial No. 771,501

3 Claims. (Cl. 196—52)

1

This invention relates to a process of converting hydrocarbon oils in the presence of hydrofluoric acid catalyst. More particularly, it relates to a continuous process of converting higher-boiling hydrocarbons, such as gas oil and kerosene, into gasoline with concurrent production of a high-boiling tar fraction, the reaction being carried out in the presence of HF, which is recycled in the process.

One object of the invention is to provide a method for converting heavy oils in a continuous manner with instantaneous removal of the lower-boiling conversion products. Another object of the invention is to provide a process for producing lower-boiling hydrocarbons, particularly isobutane and isopentane and the corresponding olefins in a higher proportion to other conversion products than heretofore obtainable in HF conversion processes. Still another object of the invention is to conduct the HF conversion reaction in a reaction zone occupied by both liquid phase and vapor phase. A still further object of the invention is to produce, by the HF catalyzed cracking reaction, a gasoline containing a higher proportion of unsaturated hydrocarbons than previously obtainable in this process.

The invention is illustrated by a drawing which shows, diagrammatically, an apparatus suitable for carrying out the process, the reaction chamber having the form of a fractionating tower.

The hydrocarbon feed stock for my process may suitably be gas oil, heavy naphtha, refractory gas oil, or so-called cycle oil from other cracking processes, either catalytic or thermal, topped crude oil, paraffin wax, heavy distillates from the Fischer process, or other relatively high-boiling paraffinic, naphthenic, or aromatic stock.

When unsaturated olefinic products are desired, it is preferred to employ feed stocks substantially free of aromatic constituents. For this purpose, aromatics may be extracted from gas oil, e. g. straight-run gas oil, by treating with selective solvents in a manner well known in the art.

Referring to the drawing, the charging stock is introduced by line 10 to reactor 11, the point of introduction being preferably near the upper part of the reactor. The reactor is a vertical tower, provided with contacting plates or baffles 12, which may have various forms conventional in the fractionation and contacting art. Thus, I may suitably employ disk and donut plates, bubble plates, or heterogeneous packing materials such as Raschig rings, Berl saddles or other suitable contacting material providing adequate porosity for vapor-liquid contacting.

The feed stock introduced by line 10 is preferably preheated to approximately reaction temperature which is suitably about 200 to 400° F., generally about 250 to 350° F. As the oil flows downwardly over the baffles in the tower 11, it meets an ascending current of HF vapor introduced at a low point in the tower by lines 13 and 14. A portion of the HF vapor condenses in the hydrocarbon stock supplying a liquid HF phase on the baffles in the tower over which the hydrocarbon flows in its passage to the bottom of the tower. As a result of this action, the hydrocarbon is subjected to cracking on contact with the liquid HF phase, and both hydrocarbon and liquid HF phases containing dissolved carbonaceous products produced in the conversion reaction flow downwardly to the lower and hotter end of the tower.

The temperature at the bottom of the tower is suitably maintained by preheating the HF vapor charged to the tower or by use of a reboiler, not shown, as will be hereinafter described. Thus the temperature of the HF charged to the tower by lines 13 and 14 may be about 300 to 500° F. The heat provided in this manner is preferably sufficient to supply the heat required for the endothermic cracking reaction occurring in the tower, to maintain the desired internal reflux ratio and to allow recovery of a bottom product of relatively low HF content.

The uncondensed HF vapor passing upwardly through tower 11 serves to distill off the lighter hydrocarbon conversion products as rapidly as they are produced in the cracking reaction. The effect of rapid removal of conversion products is to produce a distilled product with a higher content of unsaturated hydrocarbons than has heretofore been obtainable where the products remained in contact with the liquid HF phase. The vapors of HF and hydrocarbon products are conducted from the top of the reaction tower by line 15 and valve 16 to scrubber or absorber 17. The pressure in scrubber 17 is regulated to permit condensation of only the hydrocarbon fractions, thus leaving HF in the vapor phase, as it is usually desirable to avoid a separate HF liquid phase at this point. The liquefied hydrocarbons are withdrawn by line 18 from the bottom of scrubber 17 and conducted to stripper 19 wherein the hydrocarbon products are distilled off by line 20, condensed in condenser 21, and collected in receiver 22, the gaseous products being vented at 23 and gasoline withdrawn by line 24. Stripper 19 may be suitably operated at a lower pressure than scrubber 17.

Unvaporized oil at the base of stripper 19 is conducted by line 25 to the top of scrubber 17, through which it cascades in contact with the HF vapors passing upward therethrough, the oil serving in this way to absorb from the HF, desired hydrocarbon products, particularly those boiling in the gasoline boiling range. At the same time condensation of HF as a separate liquid phase in the presence of the hydrocarbon distillate is entirely avoided, thereby avoiding undesired polymerization reactions and loss of unsaturates. The absorber oil employed in line 25 is preferably a saturated oil, such as straight-run kerosene, light gas oil, etc. In order to still further facilitate the removal of dissolved HF from the liquid condensate in the base of scrubber 17, I may introduce stripping gas in the base of the scrubber. Line 26 is indicated for this purpose, the gas being supplied as hereinafter described.

From the top of scrubber 17, HF vapor is withdrawn by line 27 leading to condenser 28 and receiver 29, where liquid HF is collected as a lower layer 30, and light condensable hydrocarbons not removed in scrubber 17 are collected as an upper layer 31. The light hydrocarbons can be withdrawn from time to time by line 32.

Uncondensed gases, chiefly hydrocarbon gases including methane, ethane and propane, are withdrawn by line 33 and vented at 34. A portion of the gases can be recycled by blower 35 and line 26 for stripping HF from liquid hydrocarbon products at the base of scrubber 17 as hereinabove described. When used in this manner, it may be desirable to remove from the gases so recycled any HF vapors contained therein, for example, by water or alkali washing or by absorbing in bauxite or other suitable absorbing agent by means not shown.

Recovered liquid HF collecting in receiver 29 is withdrawn by line 36 and conducted by pump 37 back to reactor 11, into which it may be introduced at the top by line 38 where it serves as a refluxing medium and conversion catalyst. Additional cooling may be supplied to the top of reactor 11 by means not shown, to provide more reflux HF if desired. Alternatively, it may be conducted by line 39 to heater 40 where it is vaporized, the vapors being introduced into the reactor by lines 14 and/or 41. In an alternative method of operation, HF vapor may be recycled from the top of scrubber 17 to a low point in the reactor without condensation by means not shown.

It is desirable to control the pressure within reactor 11 in relation to the temperature employed therein in order to maintain a liquid HF phase in the reactor. In general, the pressure employed in the tower will lie within the range of about 200 to 1200 p. s. i., usually about 600 to 800 p. s. i. The proportion of HF-soluble hydrocarbon products may be increased by recycling the so-called "tar phase," from the bottom of the tower by line 42, returning it to one or more intermediate points in the upper part of the tower by lines 43, 44 or 45, pump 46 being employed for this purpose. The amount of tar phase recycled in this manner may be about one-half to three times the amount withdrawn at the base of the tower, as hereinafter described.

In order to prevent accumulation of the tar phase in the reactor 11, a portion of it is withdrawn by line 47 to tar flasher 48, the pressure being reduced to a low pressure, for example atmospheric pressure, by valve 49. Additional heat for flashing may be supplied by heating coil 50. HF vapor is withdrawn by line 51 leading to condenser 52 wherein it is condensed. Liquid HF is collected in receiver 53, from which HF is withdrawn by line 54 and pump 55 to heater 40 for reintroduction in reactor 11 or to line 38 for use as reflux as hereinabove described. Any initial light hydrocarbons released from the HF on condensation in 53 are withdrawn as an upper layer through line 56, line 57 being provided for uncondensed gases. Unvaporized tar, collected in drum 48, is withdrawn at the base by line 58.

HF dissolved in the products may be recovered by water washing, or may be removed by neutralizing in a manner well known in the art, and recovered HF obtained in this way may be dehydrated and returned to the conversion system. It is preferred to conduct the process to produce only gasoline as an overhead fraction, and substantially non-volatile tar as a bottoms fraction, the usual recycle intermediate boiling oil being completely converted in the reactor. Operating in this way, it is not necessary to recycle any hydrocarbon fraction to the process. However, hydrocarbon gases from 34 or hydrogen may be recycled through the reactor 11, injecting them at the bottom by means not shown.

After scrubbing the gases withdrawn by line 23 to remove the HF therefrom, they may be contacted with an absorbent to recover $C_3$, $C_4$, and heavier hydrocarbons, the residual gases being then employed for fuel or for other purposes. The recovered gaseous hydrocarbons together with normal gaseous hydrocarbons, particularly $C_3$ and $C_4$ hydrocarbons obtained by stabilization of the gasoline withdrawn by line 24, may be employed in alkylation and polymerization processes to convert them into additional amounts of gasoline of high knock rating.

As hereinabove indicated, an important feature of my process is the use of a stream of HF vapor passing through the reaction zone to remove, by distillation, initial lower-boiling products of the conversion reaction, and thus avoid to a large extent loss of these products by secondary reactions, such as isomerization, alkylation, and polymerization. Thus, olefinic hydrocarbons produced as initial products of the conversion reaction, which would normally be polymerized in the presence of the liquid HF phase, are removed from the reaction zone before this polymerization occurs. Alkylation of such olefinic products by interaction with aromatic constituents dissolved in the liquid HF phase is also largely avoided by operating in the manner described. On account of the low molecular weight of HF, I find that it is extremely effective for this purpose when compared on a weight basis with hydrocarbon gases for example. Furthermore, because of its highly polar character, HF does not significantly depress the vapor pressure of the hydrocarbons desired in the overhead reaction products, and these are withdrawn as an azeotrope. The amount of HF vapor withdrawn at the top of reactor 11 may be varied, depending on the character of the feed stock and the characteristics of the products desired. Ordinarily the amount of HF vapor withdrawn from the reactor by line 15 will be about 5 to 35 mols per mol of feed stock introduced by line 10, although somewhat smaller amounts, e. g. 2 to 5 mols, may be employed under some conditions.

Having thus described my invention what I claim is:

1. The method of converting a hydrocarbon which is higher boiling than gasoline into lower boiling hydrocarbons at least some of which are unsaturated, which method comprises introducing hydrocarbons higher boiling than gasoline at a high level in a countercurrent contacting zone at a temperature in the range of about 200° to 400° F., introducing at a low level in the contacting zone a stream of hydrogen fluoride vapors heated to a temperature in the range of 300° to 500° F. which is higher than the temperature at which hydrocarbons are introduced, countercurrently contacting said hydrogen fluoride vapors and hydrocarbons in said contacting zone under a pressure in the range of 200 to 1200 pounds per square inch which is sufficiently high to maintain hydrocarbons higher boiling than gasoline in liquid phase and sufficiently low to effect condensation of only a part of the hydrogen fluoride vapors and to permit vaporization of reaction products lower boiling than gasoline, whereby a portion of the introduced hydrogen fluoride vapors are condensed in liquid phase hydrocarbons and contacted therewith under conditions to effect catalytic cracking thereof with a catalyst consisting of liquid hydrogen fluoride into low boiling products which are immediately vaporized and carried upwardly in uncondensed hydrogen fluoride vapors without undergoing the further conversion which would take place if said products remain in contact with liquid hydrogen fluoride under the defined conditions, introducing the heated hydrogen fluoride vapors at such a rate as to carry the low boiling conversion products with uncondensed hydrogen fluoride vapors upwardly out of the top of the contacting zone, removing from the bottom of the contacting zone hydrocarbons which are higher boiling than those introduced into the contacting zone and separately removing hydrogen fluoride from the low boiling products withdrawn from the top of the contacting zone and from the high boiling products withdrawn from the bottom of the contacting zone, respectively.

2. The method of claim 1 wherein the amount of hydrogen fluoride withdrawn from the upper part of the contacting zone is in the range of 2 to 35 mols per mol of hydrocarbons introduced into the contacting zone.

3. The method of claim 1 which includes the step of introducing liquid hydrogen fluoride into the upper part of the contacting zone near the point of vapor withdrawal in an amount sufficient to provide reflux therein.

JOHN A. RIDGWAY, Jr.

REFERENCES CITED

The following references are of record in the file of this patent:

UNITED STATES PATENTS

| Number | Name | Date |
|---|---|---|
| 2,357,495 | Bloch | Sept. 5, 1944 |
| 2,378,762 | Frey | June 19, 1945 |
| 2,380,010 | Arnold | July 10, 1945 |
| 2,427,009 | Lien et al. | Sept. 9, 1947 |
| 2,448,015 | Burk | Aug. 31, 1948 |
| 2,454,615 | Ridgway et al. | Nov. 23, 1948 |